Patented Oct. 14, 1952

2,614,107

UNITED STATES PATENT OFFICE 2,614,107

PROCESS FOR THE REDUCTION OF CARBONYL COMPOUNDS

Irving Wender and Milton Orchin, Pittsburgh, Pa., assignors to the United States of America as represented by the Secretary of the Interior No Drawing. Application November 1, 1949, Serial No. 124,937

11 Claims. (Cl. 260—332.3)

(Granted under the act of March 3, 1883, as amended April 30, 1928; 370 O. G. 757)

The invention herein described and claimed may be manufactured and used by or for the Government of the United States of America for governmental purposes without the payment of royalties thereon or therefor.

The invention relates to a process for the reduction of carbonyl compounds having the formula

where $R_1$ is a monovalent organic radical and $R_2$ may be a monovalent organic radical or hydrogen, by reacting such compounds with a mixture of carbon monoxide and hydrogen.

The usual method for the reduction of a carbonyl group of a carbonyl compound is to treat such compound with substantially pure molecular hydrogen in the presence of a heterogeneous hydrogenation catalyst such as nickel, cobalt, manganese, iron, chromium, copper, zinc, molybdenum, palladium, cadmium or ruthenium. This method of reduction is subject to a number of drawbacks. First of all, the substantially pure hydrogen gas employed in the reduction is, in itself, a relatively expensive commodity. A second item which contributes to the costliness of the process is the catalyst which is employed. Effective hydrogenation catalysts, such as Raney nickel or copper chromite must be prepared by time-consuming and expensive procedures, so that the cost of preparing the catalyst may exceed the cost of the hydrogenation step itself. Other disadvantages stem from the fact that hydrogenation catalysts are solids and catalyze the reduction in a heterogeneous fashion, i. e., the hydrogenation of the carbonyl group takes place at the surface of the catalyst. The usual disadvantages of a process employing a heterogeneous catalyst are encountered. The catalyst surfaces are subject to poisoning by preferential absorption of various catalyst poisons. It is well known that hydrogenation catalysts are very sensitive to poisoning particularly by sulfur compounds and by carbon monoxide, which must be carefully removed from the reactants before they are introduced to the reaction zone. The well-known manipulative difficulties of contacting reactants with a catalyst which is heterogeneous are present. Thus, whether the catalyst is employed in the form of a fixed bed, or formed into a slurry and mixed with the reactants, the operational difficulties introduced by the presence of the heterogeneous phase cannot be eliminated. With fixed-bed catalyst operation, for instance, periodic shutdowns of the system are inevitable, since the catalyst bed will eventually deteriorate and need to be regenerated. Where the catalyst is slurried with the reactants, there is always the problem of removing the solid catalyst phase from the liquid phase containing the reactants and reaction products.

An object of the invention is to eliminate the disadvantages inherent in prior methods for the reduction of carbonyl compounds. More particularly, it is an object of the invention to provide a process for the reduction of carbonyl compounds having the formula

where $R_1$ is a monovalent organic radical and $R_2$ may be hydrogen or a monovalent organic radical, which employs a relatively inexpensive reducing gas in place of the substantially pure hydrogen previously used.

A further object of the invention is to provide a process for the reduction of carbonyl compounds having the formula given above that employs a catalyst which is inexpensive and requires no special preparation. Still another object of the invention is to provide a process for the reduction of carbonyl compounds of the above formula that employs a catalyst which dissolves in the reaction mixture and thereby provides a one-phase reaction mixture which may be easily manipulated. These, and other objects of the invention will become evident from the detailed description below.

The present invention is based on the discovery that when carbonyl compounds having the formula

where $R_1$ is a monovalent organic radical and where $R_2$ is selected from the class consisting of hydrogen and monovalent organic radicals, is reacted with a mixture of hydrogen and carbon monoxide in the presence of a catalyst selected from the metals of the eighth periodic group which form a carbonyl under reaction conditions, at a temperature of at least 150° C. and up to 300° C., and under elevated pressures, the carbonyl group is reduced to alcoholic group, the reduction proceeding in very good yields.

The reaction proceeds according to the following general equation:

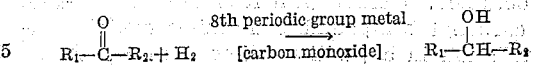

where $R_1$ and $R_2$ have the same significance as in the formulas above. In the case of the reduction of an aldehyde, the product will always be a primary alcohol and in the case of reduction of a ketone, a secondary alcohol will always result. The carbon monoxide does not directly participate in the reaction, as will be subsequently explained in more detail, but, under the reaction conditions, combines with an eighth periodic group metal, forming a metal carbonyl, which is the active catalyst in the reaction.

The reaction of formaldehyde with a mixture of carbon monoxide and hydrogen in the presence of a metal of the eighth periodic group (e. g. cobalt) does not result in the reduction of formaldehyde to methanol but rather results in the production of polyhydroxy compounds, such as ethylene glycol and glycerol. This reaction is disclosed in U. S. Patent to Gresham et al., No. 2,451,333 issued October 12, 1948.

In general, all aldehydes higher than formaldehyde and all ketones undergo reduction according to the process of the present invention. Thus, where the carbonyl compound is represented by the formula

$R_1$ in general may be any monovalent organic radical such as alkyl, aryl, alicyclic or heterocyclic radical, substituted or unsubstituted. $R_2$ may be hydrogen or a monovalent organic radical which may be the same or different from $R_1$. $R_1$ or $R_2$, or both of them, may contain carbonyl groups. Diketones or dialdehydes or other polyketones or polyaldehydes react similarly to the monoketones and monoaldehydes, all of the carbonyl groups undergoing reduction. In general, other functional groups, such as hydroxyl, carboxy, carboalkoxy, alkoxy, amine, amide, nitrile, sulfhydryl, may be present in the molecule without interfering with the reduction. Thus, the reaction can be applied to the reduction of such aliphatic aldehydes as acetaldehyde, propionaldehyde, butyraldehyde, valeraldehyde, heptaldehyde, and others in the aliphatic series. Aromatic aldehydes such as benzaldehyde or naphthaldehyde, heterocyclic aldehydes such as $\alpha$-thiophene aldehyde, dialdehydes, such as succinaldehyde may be reduced according to the process of the present invention. Ketones such as acetone, methyl ethyl ketone, dibutyl ketone, dibenzyl ketone, heterocyclic ketones, such as 2-acetyl thiophene, diketones, such as acetonylacetone may be reduced according to the process of the present invention to produce the corresponding alcohol. Industrial mixtures of aldehydes or ketones such as those resulting from aldol condensation of acetaldehyde also undergo reduction.

Carbonyl compounds which contain olefinic unsaturation other than in a position $\alpha$-$\beta$ to the carbonyl group generally react at the double bond under the reaction conditions of the present invention and undergo such reactions as the so-called Oxo reaction to produce an additional carbonyl group at the double bond. This, and other side reactions due to the olefinic unsaturation, generally predominate and produce a variety of side products so that very little of an alcohol corresponding to the starting aldehyde or ketone is obtained. Generally, if it is desired to reduce a carbonyl compound containing olefinic unsaturation in a position other than $\alpha$-$\beta$ to the carbonyl group, the unsaturated bonds should be first reduced or at least protected by addition of suitable addition compounds to avoid obtaining a mixture of undesired side products.

Carbonyl compounds which contain unsaturation in the position $\alpha$-$\beta$ to the carbonyl group do not react at the double bond according to the Oxo reaction, but instead the $\alpha$-$\beta$ unsaturation is reduced along with the carbonyl group and a saturated alcohol having the same number of carbon atoms as the starting aldehyde or ketone is produced. Thus, crotonaldehyde will react with synthesis gas according to the process of the present invention according to the following general equation:

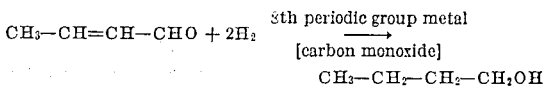

Other $\alpha$-$\beta$ unsaturated aldehydes or ketones such as acrolein, mesityl oxide or cinnamic aldehyde react similarly.

Aldehydes and ketones of higher molecular weight such as 2-naphthaldehyde or benzophenone which are solids under atmospheric conditions, undergo reduction according to the process of the invention. If desired, an inert solvent may be employed with these high molecular weight carbonyl compounds, or with any carbonyl compound regardless of molecular weight, but the use of a solvent is generally not necessary.

The reduction may be carried out in a batch process using a high pressure autoclave, or in a continuous process involving continuous feed of the reactants and a continuous withdrawal of the reaction products. The reduction may be carried out on a large scale for the production of industrial alcohols such as butanol from butyraldehyde or crotonaldehyde, heptanol from heptaldehyde, or isopropyl alcohol from ketone.

The reaction of the present invention, involving the reduction of a carbonyl group by means of a mixture of carbon monoxide and hydrogen, requires the presence of a catalyst selected from metals of the eighth periodic group of the periodic table of elements which forms a carbonyl under the conditions of the reaction. Metals of the eighth periodic group (see Lange's Handbook of Chemistry, 5th Ed. (1944) pp. 52 and 53) include iron, cobalt, nickel, ruthenium, rhodium, palladium, osmium, iridium, and platinum. Of these metals cobalt is particularly useful since it displays a high catalytic activity, is comparatively cheap and readily available, and readily forms a carbonyl under conditions of the reaction. Iron is also quite useful but does not have as great a catalytic activity as cobalt.

The catalyst may be added to the reaction mixture in the uncombined metallic state, preferably finely divided, or in the form of a salt which does not interfere with the reaction. For example, in the case of cobalt, cobalt chloride, cobalt carbonate, cobalt oxide, cobalt acetate, and cobalt stearate are examples of suitable salts. Whatever catalyst is selected from the metals of the eighth periodic group, it is necessary that the catalyst selected form a carbonyl under the conditions of the reaction. The carbonyl which forms under the reaction conditions, usually by combination of the metal with the carbon monoxide present in the synthesis gas dissolves in the reaction mixture and it is the dissolved carbonyl which acts as a homogeneous catalyst for the reaction. If desired, the carbonyl may be prepared in advance of the reaction and added to the reactants at atmospheric conditions. Due to the fact that most of the carbonyl compounds will be liquids under the entire range of reaction conditions (150° to 300° C. and 500 to 60,000 pounds per square inch), most of the reactions of the present invention will take place in the liquid phase with the metal carbonyl catalyst dissolved in the reaction mixture.

Elevated temperatures of at least 150° C. and up to 300° C. are required for the reduction to proceed with any appreciable yield of alcohols from the starting aldehydes and ketones. With most carbonyl compounds, high yields of alcohols resulting from reduction of the corresponding carbonyl compounds, are obtained at temperatures slightly above 150° C., for example, 160° to 180° C. Below 150° C. poor yields are obtained with any given carbonyl compound, since at these temperatures the reduction of the carbonyl group proceeds very slowly, if at all, and the carbonyl group will preferentially undergo condensation reactions, such as the aldol condensation, which further interferes with the reduction. At temperatures above about 300° C. other difficulties appear, such as decomposition of the carbonyl which is necessary for catalysis of the reaction, formation of excessive amounts of hydrocarbons, pyrolysis of the reactants and reaction products, and various operational difficulties concomitant with operations at high temperatures. An ideal operating range for most carbonyl compounds which results in a smooth reaction and good yields is, in general, 160° to 220° C.

Elevated pressures of at least about 500 pounds per square inch are required for the reaction. At pressures below 500 pounds per square inch the rate of reaction is negligible and side reactions such as the aldol condensation of the carbonyl compounds present may predominate. There is no upper pressure limit imposed by the characteristic of the reaction itself, but even in batch autoclave operation, the difficulties of operation become great at pressures above 60,000 pounds per square inch. From the standpoint of smoothness of reaction and good yields, it is preferred to operate in the pressure range of from 1500 to 6000 pounds per square inch. In this range, the operational difficulties are not great, the yields are good, and side reactions held at a minimum.

It is preferred to conduct the reaction in the presence of an excess of synthesis gas (mixture of hydrogen and carbon monoxide). Thus, preferably from 1.5 to 5 times the stoichiometric amount of synthesis gas required for the complete reaction of all the carbonyl should be present in the reaction zone. It is, of course, necessary that at least one mole of hydrogen be present for each mole of carbonyl which reacts since the reaction consumes hydrogen in this stoichiometric amount.

Although the carbon monoxide does not directly participate in the reaction there must be at least enough carbon monoxide present to combine with an eighth periodic group metal to form a metal carbonyl. For example, when a cobalt catalyst is used, enough carbon monoxide must be present to combine with the cobalt present according to following equation:

$$2Co + 8CO \rightleftharpoons [Co(CO)_4]_2$$

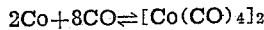

It will be noted that 4 moles of carbon monoxide must be present for every mole of cobalt. The presence of an amount of carbon monoxide less than the amount required to form the metal carbonyl will poison the reaction rather than catalyze it. The small amount of carbon monoxide merely becomes absorbed on the surface of the metal and prevents it from exercising any catalytic activity.

An excess of carbon monoxide over the amount which is required to form the necessary amount of metal carbonyl is not harmful for the conduct of the reaction. However, a molar concentration of carbon monoxide in large excess of the molar concentration of hydrogen is to be avoided since a large excess of carbon monoxide over hydrogen may give rise to side reaction leading to the formation of higher molecular weight products. The molar ratio of hydrogen to carbon monoxide should be in the range of about 1/2:1 to 10:1 and preferably in the range of from 1:1 to 4:1. A molar excess of hydrogen over carbon monoxide is not undesirable and is often preferred.

The following examples are intended to illustrate the invention:

*Example 1 (butanol-1 from butyraldehyde)*

A suspension of 7 g. of Co(OAc)$_2$.4H$_2$O in 0.85 mole (61.2 g.) of n-butyraldehyde was placed in a 0.5 liter autoclave. The autoclave was filled with 3000 p. s. i. of synthesis gas (molar ratio of H$_2$ to CO equals 1:1) at room temperature and heated to 160°–180° C. and held at this temperature for 3 hours during which time the autoclave was rocked. The autoclave was cooled and emptied. The products of the reaction were filtered and distilled directly. A fraction boiling at 116° to 117° was recovered and identified as n-butanol. 36 grams of n-butanol were recovered which is a yield of 59 percent based on the starting butyraldehyde.

*Example 2 (heptanol 1 from n-heptaldehyde)*

A suspension of 7 g. of cobalteous acetate Co(OAc)$_2$.4H$_2$O in 1.19 moles (136 g.) of heptaldehyde was placed in a 0.5 liter autoclave. The autoclave was filled with synthesis gas (molar ratio of hydrogen to carbon monoxide equals 1:1) at a pressure of 3000 pounds per square inch at room temperature and the mixture was then heated to 160° to 180° C. for 1 hour with constant rocking. The maximum pressure during this time was 3700 pounds per square inch. Hydrogen absorption was 91 percent of the theoretical amount for complete reduction of heptaldehyde. The autoclave was cooled and emptied and an analysis of the product showed the following composition:

| | Grams |
|---|---|
| Heptanol-1 | 53.5 |
| Products boiling between 163°–190° C. at 2 mm. | 14.8 |
| Residue | 2 |

The products of the reaction were first washed with acidified water, then dried and distilled. 53.5 grams of heptanol-1, boiling point 175° C. was recovered. This is equivalent of a yield of 43 percent based on the gas absorbed or a yield of 39 percent based on the starting aldehyde.

*Example 3 (reduction of benzaldehyde)*

A suspension of 7 g. of cobaltous acetate Co(OAc)$_2$.4H$_2$O in 1.30 moles (138 g.) of benzaldehyde was placed in a 0.5 liter autoclave. The autoclave was filled with synthesis gas at a pressure of 3200 pounds per square inch at atmospheric temperature and then the mixture was heated at 185° C. for 45 minutes, after which time the autoclave was cooled and emptied. The reaction products were washed with acidified water and dried with sodium sulfate and then distilled. Products of the distillation have the following composition:

| | Grams |
|---|---|
| Dibenzylether (formed by deydration of benzyl alcohol) | 85 |
| Benzyl alcohol | 16.7 |
| Unreacted benzaldehyde | 11.6 |

The yield of benzyl alcohol (including the dibenzylether resulting from dehydration of the benzyl alcohol) was 78 percent based on the starting benzaldehyde. The overall equation for the reaction may be written:

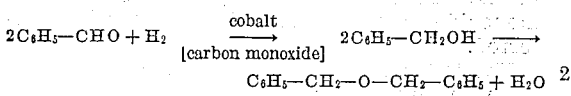

$$2C_6H_5-CHO + H_2 \xrightarrow[\text{[carbon monoxide]}]{\text{cobalt}} 2C_6H_5-CH_2OH \longrightarrow$$
$$C_6H_5-CH_2-O-CH_2-C_6H_5 + H_2O$$

*Example 4*

A suspension of 6 g. of $Co(AcO)_2.4H_2O$ in 1 mole (71.1 g.) of crotonaldehyde was placed in a 0.5 liter autoclave. The autoclave was fitted with 3200 p. s. i. synthesis gas (molar ratio of $H_2$ to CO equals 1:1) at room temperature and heated to 160°–180° C. and held at this temperature for 30 minutes, during which time the autoclave was rocked. The autoclave was cooled and emptied.

The product was dissolved in diethyl ether, filtered and distilled through a two foot Podbielniak distillation column. A fraction boiling at 116°–117° was recovered. This fraction amounted to a 31 percent yield of n-butanol (23 g.) based on the starting crotonaldehyde. The butanol was identified as the α-naphthyl urethan melting point 69.6° to 70.6° C., and the melting point was not depressed when mixed with an authentic sample.

*Example 5 (isopropyl alcohol from acetone)*

A suspension of 7 g. of $Co(OAc)_2.4H_2O$ in 1.5 moles (87 g.) of acetone was placed in a 0.5 liter autoclave. The autoclave was filled with 3000 p. s. i. of synthesis gas (molar ratio of $H_2$ to CO equals 1:1) at room temperature and the mixture was heated from 160° to 185° C. and held at this temperature for 2 hours. The autoclave was cooled and emptied and the contents distilled through a one foot column packed with glass beads. The following products were recovered:

| | Grams |
|---|---|
| Unreacted acetone | 39 |
| Isopropyl alcohol | 37.1 |

The yield of isopropyl alcohol is 75 percent based on the acetone which reacted.

From the above description it is apparent that the invention provides a method for the reduction of carbonyl compounds using synthesis gas as the reducing agent. By using synthesis gas instead of the more expensive hydrogen, the process of the invention provides an inexpensive process for the reduction of carbonyl compounds, particularly in large quantities. Water gas, which may be obtained cheaply and in any desired quantities by gasification of coal with steam and oxygen, may be employed without any alteration in the ratio of hydrogen to carbon monoxide.

The process of the present invention affords another important saving by employing catalysts which need no special preparation. Cheap and available organic and inorganic compounds of cobalt and other carbonyl-forming metals of the eighth periodic group may be used. In most cases, commercial grades of catalyst salts may be used since a high degree of purity in the catalyst is not, in general, required. The catalyst may be added to the reaction mixture in any convenient form, since under the reaction conditions the carbonyl of the metal is formed which is soluble in the reaction mixture. The reaction takes place in the homogeneous phase and the entire reaction mixture, including the catalyst, being in the same phase (usually the liquid phase) the reaction mixture may be handled with ease. It may be pumped from vessel to vessel by ordinary fluid pumps without any of the problems inherent in handling a mixture comprising a number of phases, such as the gas-liquid-solid mixture encountered in the process involving hydrogenation with the use of hydrogen gas and solid heterogeneous catalysts.

The above description and examples are intended to illustrate the invention, and is not intended that the scope of the invention be limited thereby nor in any way except by the scope of the appended claims.

We claim:

1. A process for the reduction of a carbonyl compound containing no olefinic unsaturation other than in a position α-β to the carbonyl group and having the formula

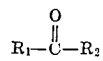

$$R_1-\overset{O}{\underset{\|}{C}}-R_2$$

where $R_1$ is a monovalent organic radical selected from the group consisting of alkyl, aryl, cycloaliphatic, and heterocyclic radicals, and $R_2$ is selected from the class consisting of hydrogen and monovalent organic radicals selected from the group consisting of alkyl, aryl, cycloaliphatic, and heterocyclic radicals, comprising the step of introducing into a reaction zone said carbonyl compound and hydrogen as the sole essential reactants, together with a catalyst consisting essentially of carbonyl of a metal of the eighth periodic group, maintaining said reaction zone at a temperature of from 150° to 300° C., and under a pressure of from 500 to 60,000 lbs./sq.in., while maintaining a concentration of carbon monoxide in said reaction zone such that the molar ratio of hydrogen to carbon monoxide lies in the range of from 0.5:1 to 10:1, and such that the concentration of carbon monoxide in said reaction zone is sufficient under the reaction conditions to insure at all times the presence of said metal carbonyl catalyst in said reaction zone.

2. A process according to claim 1 wherein the reaction is carried out in the presence of a cobalt carbonyl catalyst.

3. A process in accordance with claim 1 in which the reaction zone is maintained at a temperature of from 160° to 220° C.

4. A process for the reduction of a carbonyl compound containing no olefinic unsaturation other than in a position α-β to the carbonyl group and having the formula

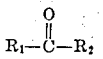

$$R_1-\overset{O}{\underset{\|}{C}}-R_2$$

where $R_1$ is a monovalent organic radical selected from the group consisting of alkyl, aryl, cycloaliphatic, and heterocyclic radicals, and $R_2$ is selected from the class consisting of hydrogen and monovalent organic radicals selected from the group consisting of aryl, alkyl, cycloaliphatic, and heterocyclic radicals, comprising the step of introducing into a reaction zone said carbonyl compound and hydrogen as the sole essential reactants, together with a catalyst consisting essentially of a carbonyl of a metal of the eighth periodic group, maintaining said reaction zone at a temperature of from 160° to 220° C., and under a pressure of from 1500 to 60,000 lbs./sq. in., while maintaining a concentration of carbon monoxide in said reaction zone such that the molar ratio of hydrogen to carbon monoxide lies in the range of from 1:1 to 4:1, and such that the concentration of carbon monoxide in said reaction zone under the reaction conditions is sufficient to insure at all times the presence of said metal carbonyl catalyst in said reaction zone.

5. A process in accordance with claim 4 wherein the reaction is carried out in the presence of a cobalt carbonyl catalyst.

6. A process for the reduction of a compound containing at least one ketone group and containing no olefinic unsaturation other than in a position $\alpha$-$\beta$ to the ketone group comprising the steps of introducing into a reaction zone said ketonic compound and hydrogen as the sole essential reactants, together with a catalyst consisting essentially of a carbonyl of a metal of the eighth periodic group, maintaining said reaction zone at a temperature of from 150° to 300° C., and under a pressure of from 500 to 60,000 lbs./sq. in., while maintaining a concentration of carbon monoxide in said reaction zone such that the molar ratio of hydrogen to carbon monoxide lies in the range of from 0.5:1 to 10:1, and such that the concentration of carbon monoxide in said reaction zone under the reaction conditions is sufficient to insure at all times the presence of said metal carbonyl catalyst in said reaction zone.

7. A process for the reduction of a compound containing at least one ketone group and containing no olefinic unsaturation other than in a position $\alpha$-$\beta$ to the ketone group comprising the steps of introducing into a reaction zone said ketonic compound and hydrogen as the sole essential reactants, together with a catalyst consisting essentially of a carbonyl of a metal of the eighth periodic group, maintaining said reaction zone at a temperature of from 160° to 220° C., and under a pressure of from 1500 to 6,000 lbs./sq. in., while maintaining a concentration of carbon monoxide in said reaction zone such that the molar ratio of hydrogen to carbon monoxide always lies in the range of from 0.5:1 to 10:1 and such that the concentration of carbon monoxide in said reaction zone under the reaction conditions is sufficient to insure at all times the presence of said metal carbonyl catalyst in said reaction zone.

8. A process according to claim 7 in which the reaction is carried out in the presence of a cobalt carbonyl catalyst.

9. A process for the reduction of a carbonyl compound having the formula

where R is a monovalent organic radical selected from the group consisting of alkyl, aryl, cycloaliphatic, and heterocyclic radicals, and which contains no olefinic unsaturation other than in a position $\alpha$-$\beta$ to the carbonyl group, comprising the steps of introducing into a reaction zone said carbonyl compound and hydrogen as the sole essential reactants, together with a catalyst consisting essentially of a carbonyl of a metal of the eighth periodic group, maintaining said reaction zone at a temperature of from 150° to 300° C., and under a pressure of from 500 to 60,000 lbs./sq. in., while maintaining a concentration of carbon monoxide in said reaction zone such that the molar ratio of hydrogen to carbon monoxide lies in the range of 0.5:1 to 10:1, and such that the concentration of carbon monoxide in said reaction zone under the reaction conditions is sufficient to insure at all times the presence of said metal carbonyl catalyst in said reaction zone.

10. A process for the reduction of a carbonyl compound having the formula

where R is a monovalent organic radical selected from the group consisting of alkyl, aryl, cycloaliphatic, and heterocyclic radicals and which contains no olefinic unsaturation other than in a position $\alpha$-$\beta$ to the carbonyl group comprising the steps of introducing into a reaction zone said carbonyl compound and hydrogen as the sole essential reactants, together with a catalyst consisting essentially of a carbonyl of a metal of the eighth periodic group, maintaining said reaction zone at a temperature of from 160° to 220° C., and under a pressure of from 1500 to 6000 lbs./sq. in., while maintaining a concentration of carbon monoxide in said reaction zone such that the molar ratio of hydrogen to carbon monoxide lies in the range of from 0.5:1 to 10:1 and such that the concentration of carbon monoxide in said reaction zone under the reaction conditions is sufficient to insure at all times the presence of said metal carbonyl catalyst in said reaction zone.

11. A process according to claim 10 wherein the reaction is carried out in the presence of a cobalt carbonyl catalyst.

IRVING WENDER.
MILTON ORCHIN.

REFERENCES CITED

The following references are of record in the file of this patent:

UNITED STATES PATENTS

| Number | Name | Date |
|---|---|---|
| 2,327,066 | Roelen | Aug. 18, 1943 |
| 2,437,600 | Gresham et al. | Mar. 9, 1948 |
| 2,464,916 | Adams et al. | Mar. 22, 1949 |
| 2,486,693 | Van't Spijker et al. | Nov. 1, 1949 |
| 2,504,682 | Harlan | Apr. 18, 1950 |